(12) United States Patent
Sayyed et al.

(10) Patent No.: US 12,292,779 B2
(45) Date of Patent: May 6, 2025

(54) SYSTEMS AND METHODS FOR BATTERY CONTEXT-AWARE LIMITING OF BIOS MANAGED OPERATIONS

(71) Applicant: Dell Products L.P., Round Rock, TX (US)

(72) Inventors: Ibrahim Sayyed, Georgetown, TX (US); Adolfo S. Montero, Pflugerville, TX (US); Jagadish Babu Jonnada, Leander, TX (US); Nikhil Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/391,641

(22) Filed: Aug. 2, 2021

(65) Prior Publication Data
US 2023/0029911 A1  Feb. 2, 2023

(51) Int. Cl.
   *G06F 1/32*      (2019.01)
   *G06F 1/3212*    (2019.01)
   *G06F 1/3218*    (2019.01)
   *G06F 1/3234*    (2019.01)
   (Continued)

(52) U.S. Cl.
   CPC .......... *G06F 1/3265* (2013.01); *G06F 1/3212* (2013.01); *G06F 1/3218* (2013.01); *G06F 9/4406* (2013.01)

(58) Field of Classification Search
   CPC .... G06F 1/3212; G06F 1/3218; G06F 1/3265; G06F 9/4401; G06F 9/4406
   See application file for complete search history.

(56) References Cited

U.S. PATENT DOCUMENTS

| | | | |
|---|---|---|---|
| 8,797,171 B2* | 8/2014 | Yasuda | H02J 7/0071 340/636.12 |
| 10,379,874 B1* | 8/2019 | Venkatasamy | G06F 1/3212 |
| 10,776,128 B2* | 9/2020 | Dou | G06F 11/30 |

(Continued)

FOREIGN PATENT DOCUMENTS

EP    1139206 A2 * 10/2001 ........... G06F 1/3203

OTHER PUBLICATIONS

Definition of Serviceability (computer), Wikipedia, https://en.wikipedia.org/w/index.php?title=Servicability_(computer)&oldid=1133819421, retrieved Jan. 6, 2025.

*Primary Examiner* — Jaweed A Abbaszadeh
*Assistant Examiner* — Cheri L Harrington
(74) *Attorney, Agent, or Firm* — Jackson Walker L.L.P.

(57) ABSTRACT

An information handling system may include a processor, a battery configured to provide electrical energy to components of the information handling system, and a basic input/output system (BIOS) communicatively coupled to the processor and embodied by executable instructions embodied in non-transitory computer readable media, the instructions configured to, when executed by the processor, in response to one of execution of a BIOS managed operation or a request for execution of the BIOS managed operation: determine an energy requirement for execution of the BIOS managed operation; determine an energy capacity of the battery; determine if the energy capacity is sufficient to satisfy the energy requirement; and limit one or more features of the BIOS managed operation in response to the energy capacity being insufficient to satisfy the energy requirement.

18 Claims, 3 Drawing Sheets

(51) Int. Cl.
*G06F 9/44* (2018.01)
*G06F 9/4401* (2018.01)

(56) References Cited

U.S. PATENT DOCUMENTS

| | | | | |
|---|---|---|---|---|
| 11,531,388 | B2* | 12/2022 | Yeh | G06F 1/324 |
| 2005/0240786 | A1* | 10/2005 | Ranganathan | G09G 3/3208 |
| | | | | 713/320 |
| 2008/0201587 | A1* | 8/2008 | Lee | H04W 52/0261 |
| | | | | 713/320 |
| 2011/0080422 | A1* | 4/2011 | Lee | G06F 1/3203 |
| | | | | 345/589 |
| 2011/0154007 | A1* | 6/2011 | Juvonen | G06F 9/4401 |
| | | | | 713/340 |
| 2013/0339757 | A1* | 12/2013 | Reddy | G06F 1/3212 |
| | | | | 713/300 |
| 2015/0089210 | A1* | 3/2015 | Lai | G06F 9/4401 |
| | | | | 713/2 |
| 2015/0268991 | A1* | 9/2015 | Agrawal | G06F 9/4881 |
| | | | | 718/103 |
| 2016/0116974 | A1* | 4/2016 | Ginnela | H04M 19/04 |
| | | | | 713/2 |
| 2016/0132065 | A1* | 5/2016 | Sultenfuss | G06F 1/3253 |
| | | | | 700/295 |
| 2016/0259649 | A1* | 9/2016 | Poornachandran | G06F 1/3203 |
| 2016/0294197 | A1* | 10/2016 | Thompson | H02J 7/007 |
| 2017/0277245 | A1* | 9/2017 | Paley | G06F 1/30 |
| 2018/0101392 | A1* | 4/2018 | Chew | G06F 9/4406 |
| 2019/0041953 | A1* | 2/2019 | Hijazi | G06F 1/3296 |
| 2019/0073012 | A1* | 3/2019 | Sultenfuss | H02J 7/0063 |
| 2021/0026649 | A1* | 1/2021 | Kotary | G06F 1/3212 |
| 2021/0089326 | A1* | 3/2021 | Banik | G06F 11/3062 |
| 2021/0382539 | A1* | 12/2021 | Suryanarayana | G06F 8/65 |
| 2022/0407337 | A1* | 12/2022 | Wang | H02J 7/0047 |

* cited by examiner

| BIOS-MANAGED OPERATION | IDENTIFIER | MINIMUM ENERGY REQUIREMENT | ATTEMPTED POWER SAVING ACTION | SAFETY ACTIONS |
|---|---|---|---|---|
| BIOS SETUP | 592df94f-4302-4642-ba2e-e50945d8e6bf | 2000 mAh | REDUCE DISPLAY POWER | LIST ONLY CRITICAL SETTINGS, SECURE BOOT, AND HARD DISK DRIVE CONFIGURATION |
| DIAGNOSTICS | cef33afd-67f3-4a08-8013-7c3311836913 | 2316 mAh | REDUCE DISPLAY POWER | GHOST OUT OPTIONS FOR FULL MODE/ADVANCED MODE |
| NETWORK-BASED RECOVERY | b7149466-5bdd-4ede-bad9-56e3be3b7519afa | 2500 mAh | REDUCE DISPLAY POWER | PREVENT DOWNLOAD OPERATION FROM BEGINNING |
| TELEMETRY | be3771dc-e167-4a82-955f-6f461a87fa12 | 2400 mAh | REDUCE DISPLAY POWER | CAPTURE ONLY HIGH-PRIORITY TELEMETRY |

FIG. 2

SYSTEMS AND METHODS FOR BATTERY CONTEXT-AWARE LIMITING OF BIOS MANAGED OPERATIONS

TECHNICAL FIELD

The present disclosure relates in general to information handling systems, and more specifically to battery context-aware limiting of basic input/output system (BIOS) managed operations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A critical component of many information handling systems is the BIOS. A BIOS may comprise boot firmware configured to be the first code executed by an information handling system when the information handling system is booted and/or powered on. In operation, a BIOS may identify, test, and/or initialize information handling resources of an information handling system. As part of its initialization functionality, BIOS code may be configured to set components of an information handling system into a known state, so that one or more applications (e.g., an operating system or other application programs) stored on compatible media may be executed and given control of the information handling system.

In many instances, a BIOS may be configured to perform one or more BIOS managed operations. A BIOS managed operation may comprise a specialized operation of BIOS which may relate to serviceability, diagnostics, pre-operating system network connectivity, configuration, and/or other functionality. Such operations may occur at times when an information handling system is being powered from a battery and without access to an alternating current (AC) power source (e.g., from a wall outlet via an AC adapter).

A BIOS session length may vary based on the type of BIOS managed operations being performed. If a battery is depleted during a BIOS managed operation and an information handling system is without access to an AC power source, an abrupt shutdown (sometimes referred to as a "dirty" shutdown) may occur and cause corruption of volatile memory, non-volatile memory, and/or a hard drive or other storage resource.

SUMMARY

In accordance with the teachings of the present disclosure, the disadvantages and problems associated with performing BIOS managed operations may be reduced or eliminated.

In accordance with embodiments of the present disclosure, an information handling system may include a processor, a battery configured to provide electrical energy to components of the information handling system, and a basic input/output system (BIOS) communicatively coupled to the processor and embodied by executable instructions embodied in non-transitory computer readable media, the instructions configured to, when executed by the processor, in response to one of execution of a BIOS managed operation or a request for execution of the BIOS managed operation: determine an energy requirement for execution of the BIOS managed operation; determine an energy capacity of the battery; determine if the energy capacity is sufficient to satisfy the energy requirement; and limit one or more features of the BIOS managed operation in response to the energy capacity being insufficient to satisfy the energy requirement.

In accordance with these and other embodiments of the present disclosure, a method may include, in a basic input/output system (BIOS) of an information handling system, in response to one of execution of a BIOS managed operation or request for execution of the BIOS managed operation: determining an energy requirement for execution of the BIOS managed operation; determining an energy capacity of a battery for powering components of the information handling system; determining if the energy capacity is sufficient to satisfy the energy requirement; and limiting one or more features of the BIOS managed operation in response to the energy capacity being insufficient to satisfy the energy requirement.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in a basic input/output system of an information handling system; determine an energy requirement for execution of the BIOS managed operation; determine an energy capacity of a battery for powering components of the information handling system; determine if the energy capacity is sufficient to satisfy the energy requirement; and limit one or more features of the BIOS managed operation in response to the energy capacity being insufficient to satisfy the energy requirement.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates an example power profile table, in accordance with certain embodiments of the present disclosure.

DETAILED DESCRIPTION

Figure 1:
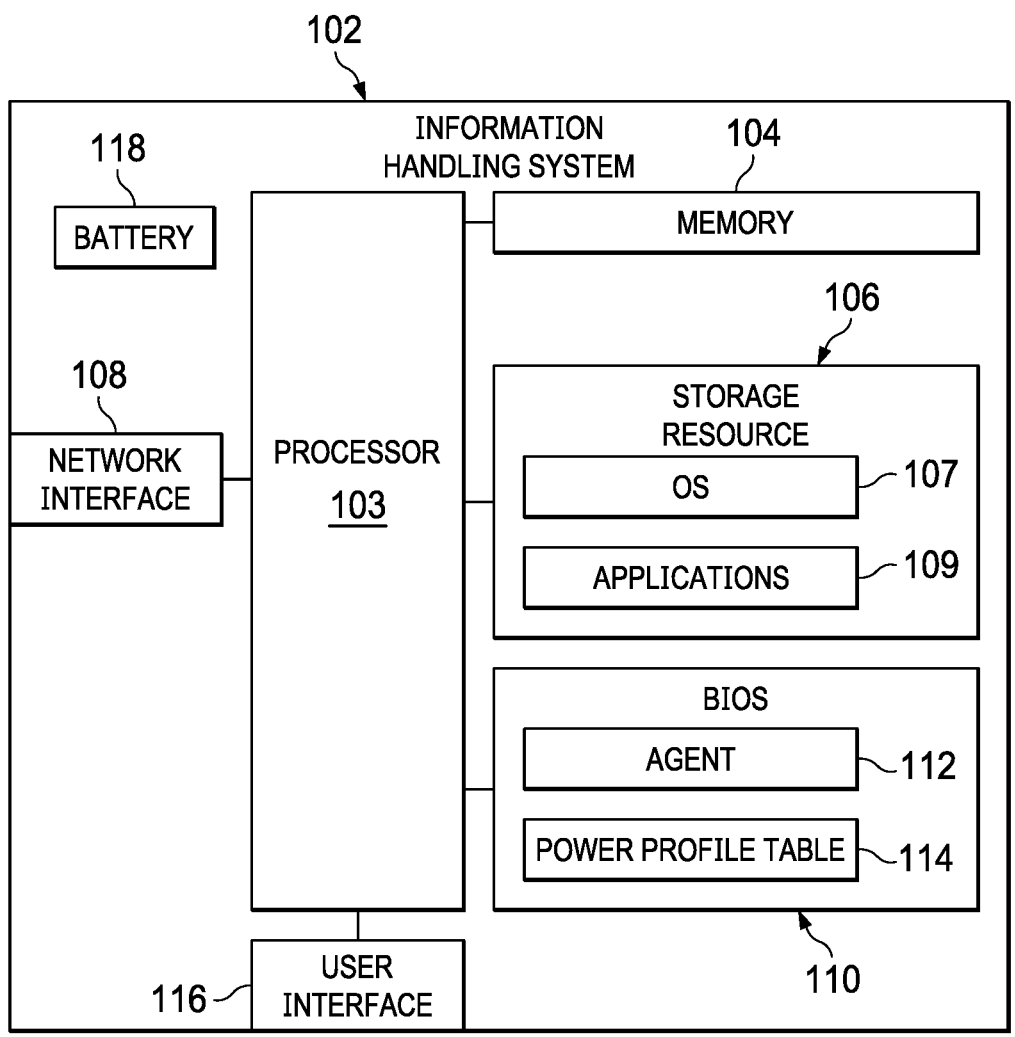
FIG. 1 illustrates a block diagram of an example information handling system, in accordance with certain embodiments of the present disclosure.
Figure 3:
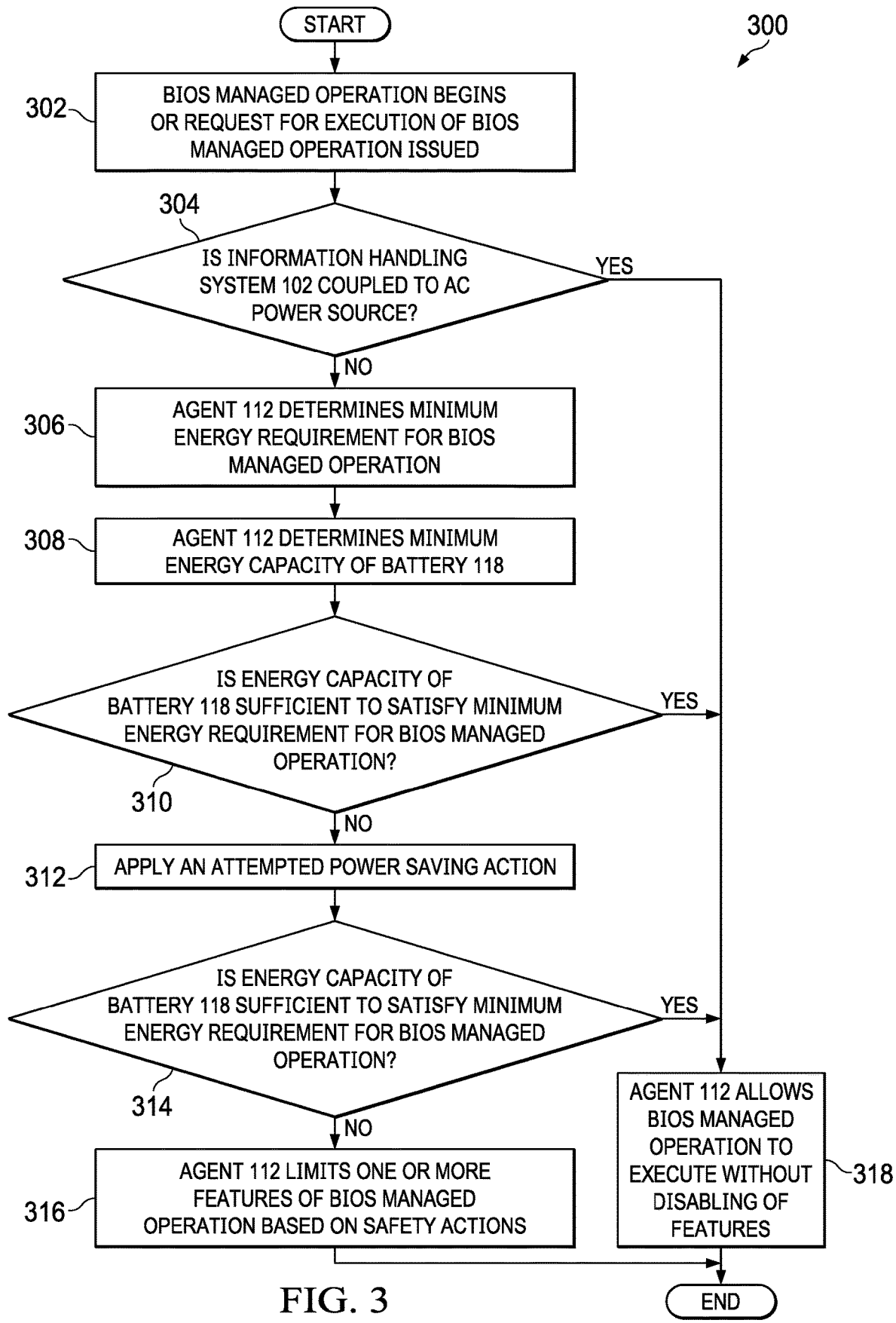
FIG. 3 illustrates a flow chart of an example method for battery context aware limiting of one or more features of BIOS managed operations, in accordance with certain embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSes), buses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, a user interface 116 coupled to processor 103, and a battery 118.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102.

As shown in FIG. 1, storage resource 106 may have stored thereon an operating system (OS) 107. Operating system 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 107. Active portions of OS 107 may be transferred from storage resource 106 to memory 104 for execution by processor 103.

As also shown in FIG. 1, storage resource 106 may have stored thereon applications 109. Applications 109 may comprise any program of executable instructions, or aggregation of programs of executable instructions, configured to execute within OS 107 in order to perform a particular task or functionality. In some embodiments, an application 109 may comprise a custom shell or a custom launcher application. OS 107 and applications 109 may be packaged in container files in Windows Image Management (WIM) format, a ZIP archive, or other container file format.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may implement an agent 112. Agent 112 may comprise any program of executable instructions, or aggregation of programs of executable instructions, configured to perform battery context-aware limiting of BIOS managed operations, as described in greater detail below.

As also shown in FIG. 1, BIOS 110 may have stored thereon power profile table 114. Power profile table 114 may comprise a table, list, map, database, or any other suitable data structure that sets forth information regarding one or more BIOS managed operations and power-related information for such BIOS managed operations. Such power-related information may include for each BIOS managed operation, without limitation, identifying information associated with a BIOS managed operation, a level of energy required to complete the BIOS managed operation, one or more attempted power saving actions associated with the BIOS managed operation, and one or more safety actions associated with the BIOS managed operation.

An example of power profile table 114 is depicted in FIG. 2. Notably, while the data listed in the column for minimum energy requirements are stated in milliampere-hours (mAh), which are not technically units of energy, those of skill in the art may recognize that mAh may serve as an indication of an amount of energy needed to complete a BIOS managed operation. Further, the various entries shown in FIG. 2 are for illustrative purposes only, and may be different from information handling system to information handling system and from battery to battery.

Turning again to FIG. 1, user interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

Battery 118 may comprise a power source having one or more electrochemical cells with external connections for powering one or more electrical devices. In particular, battery 118 may store chemical energy which may be converted to electrical energy to power one or more electrical devices. In some embodiments, battery 118 may comprise a secondary or rechargeable battery, for which electrical energy delivered to battery 118 may be converted to chemical energy, for storage and later conversion into electrical energy.

In addition to processor 103, memory 104, storage resource 106, network interface 108, BIOS 110, user interface 116, and battery 118, information handling system 102 may include one or more other information handling resources.

In operation, in response to initialization of a BIOS managed operation or request for execution of a BIOS managed operation, agent 112 may determine (e.g., from power profile table 114) a minimum energy requirement for such BIOS managed operation, determine an energy capacity of battery 118, and determine if the energy capacity is sufficient to satisfy the minimum energy requirement for the BIOS managed operation. If the energy capacity of the battery is insufficient to satisfy the minimum energy requirement for the BIOS managed operation, agent 112 may first apply an attempted power saving action (e.g., reducing power delivery to a display of user interface 116). If application of the attempted power saving action still results in the energy capacity of the battery being insufficient to satisfy the minimum energy requirement for the BIOS managed operation, agent 112 may disable one or more features of the BIOS managed operation, to ensure that execution of such feature does not result in abrupt shutdown due to depletion of charge from battery 118 during execution of the feature.

FIG. 3 illustrates a flow chart of an example method 300 for battery context aware limiting of one or more features of BIOS managed operations, in accordance with certain embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, a BIOS managed operation may begin or execution of a BIOS managed operation may be requested.

A BIOS managed operation may include any task, program, or other functionality executed by BIOS 110 relating to serviceability, diagnostics, pre-operating system network connectivity, configuration, and/or other functionality of BIOS 110. For example, a BIOS managed operation may include BIOS setup, an interface of BIOS 110 via which a user (e.g., via user interface 116) may configure one or more configuration options for execution of BIOS 110 and other components of information handling system 102. As another example, a BIOS managed operation may include performing diagnostics for one or more components of information handling system 102. As a further example, a BIOS managed operation may include a pre-operating system recovery of BIOS 110, operating system 107, and/or another component of information handling system 102 from a network via network interface 108 (e.g., BIOS Connect). As an additional example, a BIOS managed operation may include collection or communication of telemetry information associated with information handling system 102. Other BIOS managed operations may be performed other than those specifically enumerated above.

In response, at step 304, agent 112 may determine whether information handling system 102 is coupled to an AC power source. If information handling system 102 is coupled to an AC power source, method 300 may proceed to step 318.

At step 306, agent 112 may determine (e.g., from power profile table 114) a minimum energy requirement for the BIOS managed operation. At step 308, agent 112 may determine an energy capacity of battery 118. Such determination may be made based on any factor that may affect the ability of battery 118 to deliver electrical energy, including, without limitation, a state of charge of battery 118, age of battery 118, a temperature of and/or proximate to battery 118, and/or energy consumption by components of information handling system 102.

At step 310, agent 112 may determine if the energy capacity of battery 118 is sufficient to satisfy the minimum energy requirement for the BIOS managed operation. If the energy capacity of battery 118 is sufficient to satisfy the minimum energy requirement for the BIOS managed operation, method 300 may proceed to step 318. Otherwise, method 300 may proceed to step 312.

At step 312, agent 112 may apply an attempted power saving action (e.g., an attempted power saving action for the BIOS managed operation set forth in power profile table 114). At step 314, agent 112 may again determine if the energy capacity of battery 118 is sufficient to satisfy the minimum energy requirement for the BIOS managed operation, with the attempted power saving action applied. If the energy capacity of battery 118 is sufficient to satisfy the minimum energy requirement for the BIOS managed operation, method 300 may proceed to step 318. Otherwise, method 300 may proceed to step 316.

At step 316, agent 112 may limit one or more features of the BIOS managed operation, to ensure that execution of such feature does not result in abrupt shutdown due to depletion of charge from battery 118 during execution of the feature. In some embodiments, such limiting of one or more features may be based on one or more safety actions set forth with respect to the BIOS managed operation as set forth in power profile table 114. For example, if the BIOS managed operation is execution of BIOS setup, agent 112 may disable user options to perform non-critical BIOS setup options (e.g., by greying out or "ghosting" such options for selection by the user in a graphical user interface of the BIOS setup). As another example, if the BIOS managed operation is the performance of diagnostics, agent 112 may cause certain diagnostic modes (e.g., full diagnostics or advanced diagnostics) to be disabled (or otherwise prevent a user from selecting such diagnostic modes via greying out or ghosting such options), while enabling or allowing to be enabled diagnostic modes (e.g., quick diagnostics) requiring smaller amounts of energy to perform. As a further example, if the BIOS managed operation is a network-based recovery operation (e.g., recovery of BIOS 110 or operating system 107 via BIOS Connect), agent 112 may prevent the download of a recovery image until such time as AC power is restored or battery 118 has sufficient capacity. As an additional example, if the BIOS operation is the capture of telemetry information, agent 112 may limit capture of telemetry information to higher priority telemetry information, such as security alerts, errors, and/or other high priority information.

In addition to limiting features of a BIOS managed operation, agent 112 may also cause communication to the user (e.g., via user interface 116) of an alert or other message indicating that the features have been limited or disabled due to low energy capacity of battery 118 and/or suggesting that the user should couple information handling system 102 to an AC power source in order to enable such features. After completion of step 316, method 300 may end.

At step 318, agent 112 may allow the BIOS managed operation to execute without limiting of features. After completion of step 318, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a battery configured to provide electrical energy to components of the information handling system; and
   a basic input/output system (BIOS) communicatively coupled to the processor and embodied by executable instructions embodied in non-transitory computer readable media, the instructions configured to, when executed by the processor, in response to one of execution of a BIOS managed operation or a request for execution of the BIOS managed operation:
      determine whether the information handling system is coupled to an alternating current power source; and
      responsive to determining the information handling system is decoupled from the alternating current power source:
         determine an energy requirement for execution of the BIOS managed operation;
         determine an energy capacity of the battery;
         determine if the energy capacity is sufficient to satisfy the energy requirement; and
         limit one or more features of the BIOS managed operation in response to the energy capacity being insufficient to satisfy the energy requirement;
      wherein the BIOS managed operation is a specialized operation of BIOS which relates to serviceability, diagnostics, or pre-operating system network connectivity.

2. The information handling system of claim 1, the BIOS further configured to:
   apply an attempted power saving action to reduce power demands from the battery in response to the energy capacity being insufficient to satisfy the energy requirement;
   again determine if the energy capacity is sufficient to satisfy the energy requirement with the attempted power saving action applied; and
   limit the one or more features of the BIOS managed operation in response to the energy capacity remaining insufficient to satisfy the energy requirement with the attempted power saving action applied.

3. The information handling system of claim 2, wherein the attempted power saving action comprises reducing a power demanded from a display device of the information handling system.

4. The information handling system of claim 1, wherein the BIOS managed operation comprises one of BIOS setup, performance of diagnostics for one or more components of the information handling system, and a network-based pre-operating system recovery of the information handling system.

5. The information handling system of claim 1, wherein limiting one or more features of the BIOS managed operation comprises disabling selection of the one or more features by a user within a graphical user interface associated with the BIOS managed operation.

6. The information handling system of claim 1, wherein limiting one or more features of the BIOS managed operation comprises limiting features lower in priority than higher-priority features that remain enabled.

7. A method comprising, in a basic input/output system (BIOS) of an information handling system, in response to one of execution of a BIOS managed operation or request for execution of the BIOS managed operation:
   determining whether the information handling system is coupled to an alternating current power source; and
   responsive to determining the information handling system is decoupled from the alternating current power source:
      determining an energy requirement for execution of the BIOS managed operation;
      determining an energy capacity of a battery for powering components of the information handling system;
      determining if the energy capacity is sufficient to satisfy the energy requirement; and
      limiting one or more features of the BIOS managed operation in response to the energy capacity being insufficient to satisfy the energy requirement;
   wherein the BIOS managed operation is a specialized operation of BIOS which relates to serviceability, diagnostics, or pre-operating system network connectivity.

8. The method of claim 7, further comprising:
   applying an attempted power saving action to reduce power demands from the battery in response to the energy capacity being insufficient to satisfy the energy requirement;
   again determining if the energy capacity is sufficient to satisfy the energy requirement with the attempted power saving action applied; and
   limiting the one or more features of the BIOS managed operation in response to the energy capacity remaining insufficient to satisfy the energy requirement with the attempted power saving action applied.

9. The method of claim 8, wherein the attempted power saving action comprises reducing a power demanded from a display device of the information handling system.

10. The method of claim 7, wherein the BIOS managed operation comprises one of BIOS setup, performance of diagnostics for one or more components of the information handling system, and a network-based pre-operating system recovery of the information handling system.

11. The method of claim 7, wherein limiting one or more features of the BIOS managed operation comprises disabling selection of the one or more features by a user within a graphical user interface associated with the BIOS managed operation.

12. The method of claim 7, wherein limiting one or more features of the BIOS managed operation comprises limiting features lower in priority than higher-priority features that remain enabled.

13. An article of manufacture comprising:
   a non-transitory computer readable medium; and
   computer-executable instructions carried on the computer readable medium, the instructions readable by a processor, the instructions, when read and executed, for causing the processor to, in a basic input/output system of an information handling system:
      determine whether the information handling system is coupled to an alternating current power source; and
      responsive to determining the information handling system is decoupled from the alternating current power source:
         determine an energy requirement for execution of the BIOS managed operation;
         determine an energy capacity of a battery for powering components of the information handling system;
         determine if the energy capacity is sufficient to satisfy the energy requirement; and
         limit one or more features of the BIOS managed operation in response to the energy capacity being insufficient to satisfy the energy requirement;
      wherein the BIOS managed operation is a specialized operation of BIOS which relates to serviceability, diagnostics, or pre-operating system network connectivity.

14. The article of claim 13, the instructions for further causing the processor to:
   apply an attempted power saving action to reduce power demands from the battery in response to the energy capacity being insufficient to satisfy the energy requirement;
   again determine if the energy capacity is sufficient to satisfy the energy requirement with the attempted power saving action applied; and
   limit the one or more features of the BIOS managed operation in response to the energy capacity remaining insufficient to satisfy the energy requirement with the attempted power saving action applied.

15. The article of claim 14, wherein the attempted power saving action comprises reducing a power demanded from a display device of the information handling system.

16. The article of claim 13, wherein the BIOS managed operation comprises one of BIOS setup, performance of diagnostics for one or more components of the information handling system, and a network-based pre-operating system recovery of the information handling system.

17. The article of claim 13, wherein limiting one or more features of the BIOS managed operation comprises disabling selection of the one or more features by a user within a graphical user interface associated with the BIOS managed operation.

18. The article of claim 13, wherein limiting one or more features of the BIOS managed operation comprises limiting features lower in priority than higher-priority features that remain enabled.

\* \* \* \* \*